US010565787B1

(12) United States Patent
Jordan

(10) Patent No.: US 10,565,787 B1
(45) Date of Patent: Feb. 18, 2020

(54) SYSTEMS AND METHODS FOR ENHANCED 3D MODELING OF A COMPLEX OBJECT

(71) Applicant: NHIAE Group, LLC, Deerfield Beach, FL (US)

(72) Inventor: Adam Jordan, Deerfield Beach, FL (US)

(73) Assignee: NHIAE Group, LLC, Deerfield Beach, FL (US)

( * ) Notice: Subject to any disclaimer, the term of this patent is extended or adjusted under 35 U.S.C. 154(b) by 24 days.

(21) Appl. No.: 15/881,073

(22) Filed: Jan. 26, 2018

Related U.S. Application Data

(60) Provisional application No. 62/451,295, filed on Jan. 27, 2017.

(51) Int. Cl.
  *G06T 7/254* (2017.01)
  *G06T 17/05* (2011.01)
  (Continued)

(52) U.S. Cl.
  CPC ............ *G06T 17/05* (2013.01); *B64C 39/024* (2013.01); *G01S 17/88* (2013.01); *G06T 7/33* (2017.01);
  (Continued)

(58) Field of Classification Search
  CPC .. G06K 9/00335; G06K 9/00771; G06T 7/75; G06T 2207/30196; G06T 7/20;
  (Continued)

(56) References Cited

U.S. PATENT DOCUMENTS 4,891,630 A * 1/1990 Friedman ............... A61B 3/113
  340/4.13
5,383,013 A * 1/1995 Cox ....................... G06T 7/593
  356/2
(Continued)

OTHER PUBLICATIONS

Aerial Mapping & Topography: Drone (UAV) Aerial Data Acquisition, Photogrammetry, Copyright 2017 DroneView Technologies, site, http://www.droneviewtech.com/aerial-mapping-and-topography, printed on Mar. 20, 2018, pp. 3.
(Continued)

*Primary Examiner* — Mekonen T Bekele
(74) *Attorney, Agent, or Firm* — Lerner, David, Littenberg, Krumholz & Mentlik, LLP

(57) ABSTRACT

A system and method for remotely and accurately generating a 3D model of a complex object is provided through the use of laser scan data and a plurality of overlapping images taken of the complex object. To generate the 3D model first, second, and third 3D point clouds may be derived from laser scan data obtained from one or more LiDAR scanners at a first, second, and, third location, respectively, near a complex object. A fourth 3D point cloud of a first portion of the complex object may be derived from a plurality of overlapping images, wherein at least a section of the first portion of the complex object is partially or wholly occluded. The first, second, third, and fourth 3D point clouds may be combined into a single 3D point cloud and a 3D model of the complex object may be generated from the single 3D point cloud.

19 Claims, 4 Drawing Sheets

(51) Int. Cl.
  *G06T 7/73* (2017.01)
  *B64C 39/02* (2006.01)
  *G06T 7/33* (2017.01)
  *G06T 7/00* (2017.01)
  *G01S 17/88* (2006.01)

(52) U.S. Cl.
  CPC .............. *G06T 7/75* (2017.01); *G06T 7/97* (2017.01); *B64C 2201/123* (2013.01); *G06T 2207/10028* (2013.01); *G06T 2207/10032* (2013.01)

(58) Field of Classification Search
  CPC .............. G08B 21/043; G08B 21/0476; A61B 5/0022; A61B 5/1117; G06N 20/00; G06N 3/08
  See application file for complete search history.

(56) References Cited

U.S. PATENT DOCUMENTS

| | | | | |
|---|---|---|---|---|
| 7,065,461 | B2* | 6/2006 | Chang | G06Q 10/04 702/81 |
| 7,411,688 | B1* | 8/2008 | Zhai | G01B 11/2509 356/601 |
| 7,605,817 | B2* | 10/2009 | Zhang | G06T 7/285 345/473 |
| 7,843,450 | B2* | 11/2010 | Chang | G01B 21/045 345/420 |
| 8,199,977 | B2* | 6/2012 | Krishnaswamy | G06K 9/00201 345/589 |
| 8,731,313 | B2* | 5/2014 | Thiyanaratnam | G06T 9/001 382/107 |
| 9,858,640 | B1* | 1/2018 | Earl | G06T 11/60 |
| 10,255,480 | B2* | 4/2019 | Uhlenbrock | G06K 9/00214 |
| 2005/0114059 | A1* | 5/2005 | Chang | G06Q 10/04 702/84 |
| 2008/0030498 | A1* | 2/2008 | Chang | G06T 1/0007 345/419 |
| 2008/0189081 | A1* | 8/2008 | Chang | G06F 17/5009 703/1 |
| 2009/0168045 | A1* | 7/2009 | Lin | G01C 15/002 356/4.01 |
| 2010/0013909 | A1* | 1/2010 | Zhang | G06T 7/285 348/50 |
| 2011/0191023 | A1* | 8/2011 | Engstrom | A63B 57/00 701/532 |
| 2013/0016099 | A1* | 1/2013 | Rinard | G06T 15/00 345/420 |
| 2016/0364989 | A1* | 12/2016 | Speasl | G08G 5/0034 |
| 2017/0024929 | A1* | 1/2017 | Priest | H04W 24/02 |
| 2017/0046873 | A1* | 2/2017 | Terry | H04N 13/221 |
| 2017/0192418 | A1* | 7/2017 | Bethke | G05D 1/0094 |
| 2018/0101932 | A1* | 4/2018 | Kwon | G06T 3/0068 |
| 2018/0140898 | A1* | 5/2018 | Kasha | A63B 69/3632 |

OTHER PUBLICATIONS

Dischover—Drone Aerial Photography and Videography in Miami, http://www.disc-hover.com/, printed Mar. 20, 2018, pp. 5.
Drone Inspection + Software/Sentera/UAV+UAS+Sensors, https://sentera.com/drone-inspection/, copyright 2018, Sentera LLC, printed Mar. 20, 2018, pp. 15.
Solutions for Enterprises to Turn Aerial Data into Business Insights, https://www.airware.com/en/industries/construction/, copyright 2018, printed Mar. 20, 2018, pp. 3.
Talon Aerolytics, Inc., http://www.itctalon.com/services/, coyright 2018, printed Mar. 20, 2018, pp. 2.
UAV cell phone tower inspection, Micro Aerial Projects LLC, http://www.microaerialprojects.com/services/infrastructure-inspections-asset-management/communications-inspections/, printed Mar. 20, 2018, copyright 2018, pp. 6.

* cited by examiner

SYSTEMS AND METHODS FOR ENHANCED 3D MODELING OF A COMPLEX OBJECT

CROSS-REFERENCE TO RELATED APPLICATION

The present application claims the benefit of the filing date of U.S. Provisional Patent Application No. 62/451,295 filed Jan. 27, 2017, the disclosure of which is hereby incorporated herein by reference.

BACKGROUND

As the demand for wireless and broadcast communications continues to grow, there is an increased need to construct new cell towers and maintain existing cell towers. Traditionally, in order to maintain or inspect existing cell towers, workers would climb cell towers and manually inspect antennas or support members. To do this, workers may have to climb heights in excess of 200 or 300 ft.

Not surprisingly, a cell tower worker's job is considered one of the most dangerous jobs in the United States. As explained on the current Occupational Safety and Health Administration's ("OSHA") website, some of the more frequently encountered hazards include: (1) "Falls from great heights," (2) "Electrical hazards," (3) "Hazards associated with hoisting personnel and equipment with base-mounted drum hoists," (4) "Inclement weather," (5) "Falling object hazards," and (6) "Equipment failure." See OSHA, *Communication Towers*, https://www.osha.gov/doc/topics/communication tower/(last visited Jan. 21, 2017).

While efforts have been made to increase safety, accidents involving cell towers continue to occur. Thus, a system and method for remotely and accurately generating a 3D model of a cell tower that minimizes or eliminates manual inspection would be advantageous.

BRIEF SUMMARY

The present disclosure provides a system and method for remotely and accurately generating a 3D model of a complex structure (e.g., cell tower, bridge, water tower, etc.) and/or landscape (e.g., putting green, fairway, tee box, hill, mountain, etc.) through the use of laser scan data and a plurality of overlapping images taken of the complex structure or landscape (collectively "complex objects"). A light detection and ranging ("LiDAR") scanner may be used to collect laser scan data at three or more locations around the complex object. An unmanned aerial vehicle ("UAV") or piloted aerial vehicle equipped with a camera may also be used to collect a plurality of overlapping images of the complex object. Through the use of the disclosed systems and methods, the dimensions of the various portions which make up the complex object, such as support members or hills and slopes, may be modeled within the 3D model with an accuracy within, for example, 0.5 mm or more or less. One aspect of the disclosure provides a method comprising: deriving a first 3D point cloud from scan data obtained from a scanner at a first location near a complex structure; deriving a second 3D point cloud from scan data obtained from a scanner at a second location near the complex structure; deriving a third 3D point cloud from scan data obtained from a scanner at a third location near the complex structure; deriving a fourth 3D point cloud of an upper portion of the complex structure from a plurality of overlapping images captured by a UAV; and combining all of the 3D point clouds into a single 3D point cloud.

Another aspect of the disclosure provides a method comprising: deriving a first 3D point cloud from laser scan data obtained from a LiDAR scanner at a first ground location near a cell tower; deriving a second 3D point cloud from laser scan data obtained from a LiDAR scanner at a second ground location near the cell tower; deriving a third 3D point cloud from laser scan data obtained from a LiDAR scanner at a third ground location near the cell tower; deriving a fourth 3D point cloud of an upper portion of the cell tower from a plurality of overlapping images captured by a UAV, wherein the upper portion of the cell tower includes at least one antenna cluster with a partially or wholly occluded object from a ground-based perspective; combining the first, second, third, and fourth 3D point clouds into a single 3D point cloud; and generating a 3D model of the cell tower from the single 3D point cloud.

Yet another aspect of the disclosure provides a system comprising one or more computing devices configured to: derive a first 3D point cloud from scan data obtained from a scanner at a first location near a complex structure; derive a second 3D point cloud from scan data obtained from a scanner at a second location near the complex structure; derive a third 3D point cloud from scan data obtained from a scanner at a third location near the complex structure; derive a fourth 3D point cloud of an upper portion of the complex structure from a plurality of overlapping images captured by a UAV; and combine all of the 3D point clouds into a single 3D point cloud.

Another aspect of the disclosure provides a system comprising one or more computing devices configured to: derive a first 3D point cloud from laser scan data obtained from a LiDAR scanner at a first ground location near a cell tower; derive a second 3D point cloud from laser scan data obtained from a LiDAR scanner at a second ground location near the cell tower; derive a third 3D point cloud from laser scan data obtained from a LiDAR scanner at a third ground location near the cell tower; derive a fourth 3D point cloud of an upper portion of the cell tower from a plurality of overlapping images captured by a UAV, wherein the upper portion of the cell tower includes at least one antenna cluster with a partially or wholly occluded object from a ground-based perspective; combine the first, second, third, and fourth 3D point clouds into a single 3D point cloud; and generate a 3D model of the cell tower from the single 3D point cloud.

Another aspect of the disclosure provides a method comprising: deriving a first 3D point cloud from laser scan data obtained from one or more LiDAR scanners at a first location near a complex object; deriving a second 3D point cloud from laser scan data obtained from the one or more LiDAR scanners at a second location near the complex object; deriving a third 3D point cloud from laser scan data obtained from the one or more LiDAR scanners at a third location near the complex object; deriving a fourth 3D point cloud of a first portion of the complex object from a plurality of overlapping images, wherein at least a section of the first portion of the complex object is partially or wholly occluded; combining the first, second, third, and fourth 3D point clouds into a single 3D point cloud; and generating a 3D model of the complex object from the single 3D point cloud.

In some instances, the complex object is a cell tower. In some examples, the first portion of the complex object is an upper portion of the cell tower and the section includes at least one antenna cluster.

In some instances, the complex object is one or more of a putting green, a fairway, and tee box. In some examples, the first portion of the complex object is a lower portion of the complex object. In some embodiments the section includes at least one valley in the complex object.

In some instances, the first 3D point cloud, the second 3D point cloud, and the third 3D point cloud are respectively captured from one or more ground-based perspectives. In some example, the first portion is partially or wholly occluded from at least one of the one or more ground-based perspectives.

In some embodiments, the plurality of images are captured from the perspective of an unmanned aerial vehicle ("UAV") in flight. In some example, the plurality of overlapping images are captured from one or more cameras mounted to the UAV.

Another aspect of the disclosure provides a system comprising one or more computing devices configured: derive a second 3D point cloud from laser scan data obtained from the one or more LiDAR scanners at a second location near the complex object; derive a third 3D point cloud from laser scan data obtained from the one or more LiDAR scanners at a third location near the complex object; derive a fourth 3D point cloud of a first portion of the complex object from a plurality of overlapping images, wherein at least a section of the first portion of the complex object is partially or wholly occluded; combine the first, second, third, and fourth 3D point clouds into a single 3D point cloud; and generate a 3D model of the complex object from the single 3D point cloud.

Another aspect of the disclosure provides a system comprising one or more computing devices configured to derive a first 3D point cloud of a first portion of a complex object from a plurality of overlapping images and generate a 3D model of the complex object from the first 3D point cloud.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting.

Figure 1:
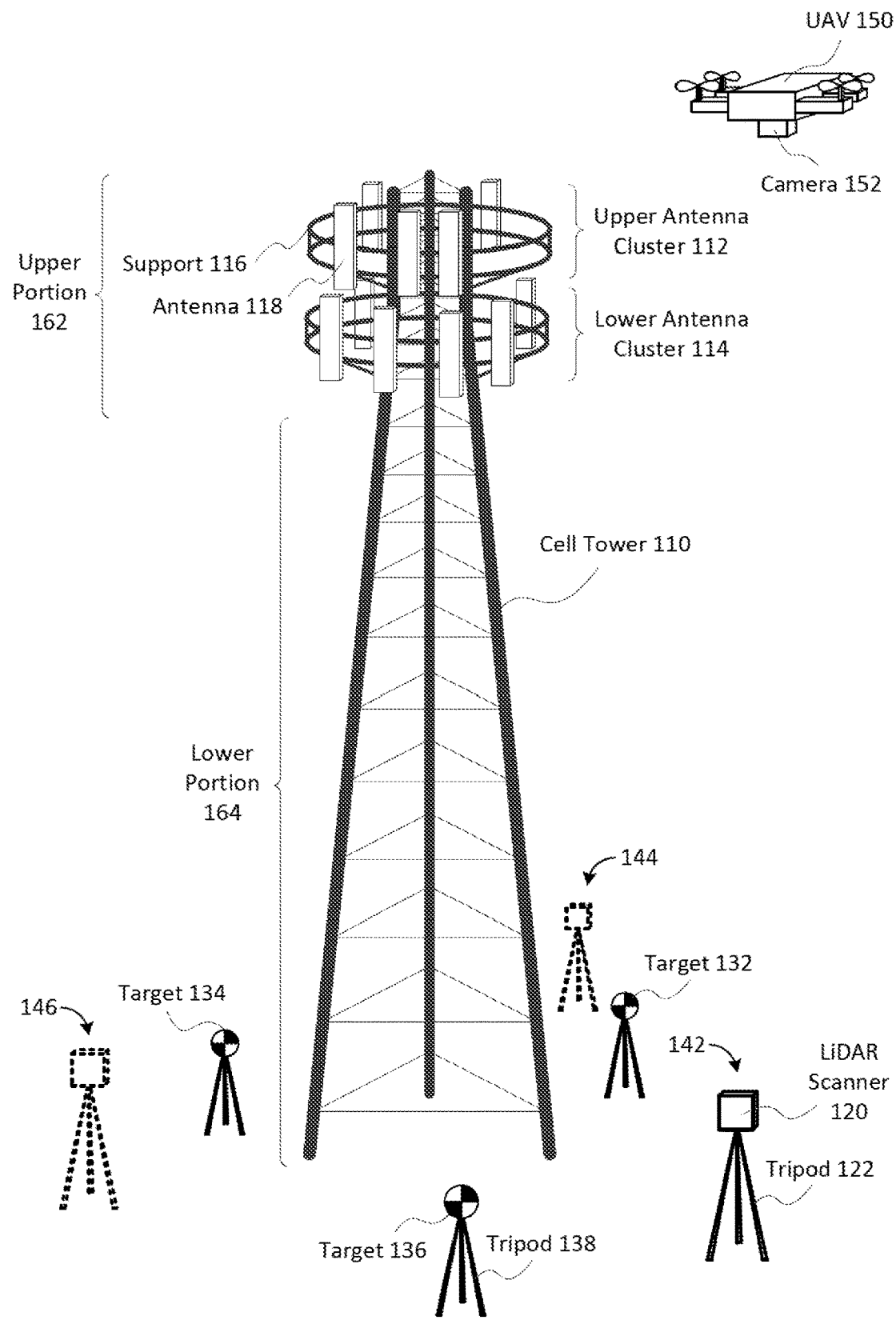
FIG. 1 illustrates various devices that may be used to collect the underlying data used to generate a 3D model of a complex object.

FIG. 1 illustrates various devices that may be used to collect the underlying data used to generate a 3D model of a complex object, such as cell tower 110. As shown in FIG. 1, cell tower 110 includes upper antenna cluster 112 and lower antenna cluster 114. Upper antenna cluster 112 includes antenna 118, which is attached to support 116. Antenna 118 may, for example, be an omnidirectional high-gain antenna array suitable for facilitating cellular communications. Collectively, upper antenna cluster 112, lower antenna cluster 114, and any nearby supports of cell tower 110 may be referred to as upper portion 162 of cell tower 110. The rest of cell tower 110 may be referred to as lower portion 164 of cell tower 110.

In other embodiments, cell tower 110 may have more or less antenna clusters. For example, cell tower 110 may only have one antenna cluster. In another example, cell tower may have six antenna clusters. As shown in FIG. 1, cell tower 110 is a variation of a self-supporting lattice tower. However, in other embodiments, cell tower 110 may be a monopole tower. In other embodiments, cell tower 110 may not even be a self-supporting structure. For example, cell tower 110 could be guyed tower. Cell tower 110 may also include other types of equipment. For example, cell tower 110 may include a microwave dish.

LiDAR scanner 120 can be used to collect laser scan data pertaining to cell tower 110. LiDAR scanner 120 may, for example, be a Leica ScanStation. In order to generate an accurate 3D model of cell tower 110, one may place LiDAR scanner 120 at three or more different locations around the base of cell tower 110 and collect laser scan data at each of those locations using LiDAR scanner 120. For example, as shown in FIG. 1, LiDAR scanner 120 may be placed at locations 142, 144, and 146. The laser scan data at each of those locations may be used to generate a 3D point cloud. Each 3D point cloud may include a plurality of points corresponding to where, relative to the position of LiDAR scanner 120, a laser beam was reflected off of the surface of a nearby object. As shown in FIG. 1, LiDAR scanner 120 includes tripod 122. Thus, a person may need to manually reposition LiDAR scanner 120. However, in some embodiments, LiDAR scanner 120 may be mounted on a vehicle. In such embodiments, the vehicle may be controlled remotely. Although not shown, LiDAR scanner 120 may also include other components, such as, for example, a GPS subsystem and a wireless communications subsystem.

The breadth and resolution of the laser scan data collected with LiDAR scanner 120 at a particular location can be varied. For example, LiDAR scanner 120 may be used to collect laser scan data pertaining to all nearby objects within a 360° field of view, or more or less. In other embodiments, LiDAR scanner 120 may only be used to collect laser scan data for all nearby objects within a field of view that is limited by the location, width, and/or height of cell tower 110. The laser scan data associated with a particular location may also include data from multiple scans performed at varying resolutions. For example, LiDAR scanner 120 could be used to perform a 360° scan of the entire area around cell tower 110 at a resolution of $\frac{1}{16}$ in, or more or less. LiDAR scanner 120 could also be used at the same location to only scan specific portions of cell tower 110 at higher resolutions. For example, LiDAR scanner 120 could be used to only scan upper portion 162 at a resolution of $\frac{1}{32}$ in. Similarly, LiDAR scanner 120 could be used to only scan lower portion 164 at a resolution of $\frac{1}{32}$ in. In some embodiments, a 360° scan may be used to verify that high-resolution laser scan data corresponding to specific portions of cell tower 110 were properly combined.

LiDAR scanner 120 may transfer laser scan data and other types of data to a computing device, such as, for example, a desktop computer or a laptop. For example, LiDAR scanner 120 may transfer laser scan data to a computing device through any one of the following types of interfaces: USB, Ethernet, RS-232, Serial Peripheral Interface ("SPI"), I2C, or a custom-defined communications interface. LiDAR scanner 120 may also wirelessly transmit laser scan data to a computing device through, for example, Wi-Fi, Bluetooth, ZigBee, and/or a custom-defined wireless communications protocol. Similarly, a computing device may control and/or configure LiDAR scanner 120 through a physical and/or wireless communications interface.

Targets 132, 134, and 136 are placed around the base of cell tower 110. Targets 132, 134, and 136 provide a set of easily identified reference points for combining the three 3D point clouds derived from the laser scan data obtained with LiDAR scanner 120 at locations 142, 144, and 146. As shown in FIG. 1, targets 132, 134, and 136 include circles with a black and white checkered pattern. However, other types of patterns and colors may be used. For example, each of the targets may include a blue circle with a large white dot placed at the center of the blue circle. Furthermore, as shown in FIG. 1, target 136, for example, includes tripod 138. However, target 136 could also include a support structure that can be temporarily attached to cell tower 110. Target 136 may also be mounted on a vehicle to facilitate positioning and/or repositioning target 136 before and/or after any scans performed by LiDAR scanner 120. In such embodiments, the vehicle may be controlled remotely.

UAV 150 may be an autonomous aircraft or a remotely piloted aircraft, or other such device. As shown in FIG. 1, UAV 150 includes camera 152. In some embodiments, camera 152 may be capable of capturing 42, or even 100, megapixel images. UAV 150 may also include other components, such as, for example, a GPS subsystem and a wireless communications subsystem. UAV 150 may also include an ultrasonic thickness gauge for measuring the thickness of various support members of cell tower 110. This type of data may be especially useful when the support members are, for example, tubes or pipes with enclosed hollow portions. UAV 150 may be used to collect a plurality of overlapping images of cell tower 110. In particular, UAV 150 may capture a plurality of overlapping images of upper antenna cluster 112, lower antenna cluster 114, and nearby support members of cell tower 110. Through the use of photogrammetry software, these overlapping images may be used to derive a 3D point cloud corresponding to upper portion 162 of cell tower 110.

In some embodiments, UAV 150 may be directed to circle around the center of cell tower 110 at a radius of 27 to 33 ft. and a speed at 0.8 to 1.2 mph. Furthermore, UAV 150 may capture an image of upper portion 162 of cell tower 110 at every 3 to 5 degrees of this circular flight pattern. After completely circling cell tower 110, UAV 150 may be directed to decrease its elevation by, for example, 2.8 to 3.2 ft., and then repeat a similar circular flight pattern. In some embodiments, UAV 150 may be directed to start at an elevation where the top of cell tower 110 is within the field of view of camera 152. The circular flight pattern described above, which is followed by a decrease in elevation, may be repeated until lower antenna cluster 114 is out of the field of view of camera 152. In some embodiments, the overlap between any pair of images consecutively captured at the same elevation may be 95% or more. For example, if UAV 150 is equipped with a 100 megapixel camera, the overlap between any pair of images consecutively captured at the same elevation may be 95%. Similarly, if UAV 150 is equipped with a 42 megapixel camera, the overlap between any pair of images consecutively captured at the same elevation may be 97%. In general, by increasing the amount of overlap between any pair of consecutively captured images, a more accurate 3D point cloud can be derived. In some embodiments, an increased amount of overlap may also compensate for the use of a camera with a lower image resolution.

UAV 150 may transfer captured images, flight path data, and other types of data to a computing device, such as, for example, a desktop computer or a laptop. For example, UAV 150 may transfer captures images to a computing device through any one of the following types of interfaces: USB, Ethernet, RS-232, Serial Peripheral Interface ("SPI"), I2C, or a custom-defined communications interface. UAV 150 may also wirelessly transmit captured images to a computing device through, for example, Wi-Fi, Bluetooth, ZigBee, and/or a custom-defined wireless communications protocol. Similarly, a computing device may control and/or configure UAV 150 through a physical and/or wireless communications interface.

Figure 2D:
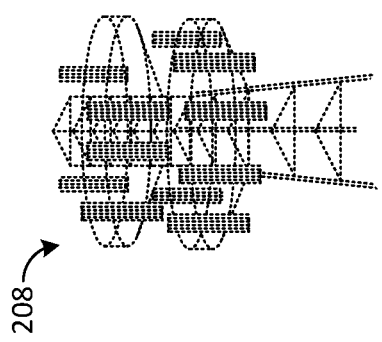
FIG. 2D illustrates a portion of a 3D point cloud derived from a plurality of overlapping images of the complex object of FIG. 1.
Figure 2C:
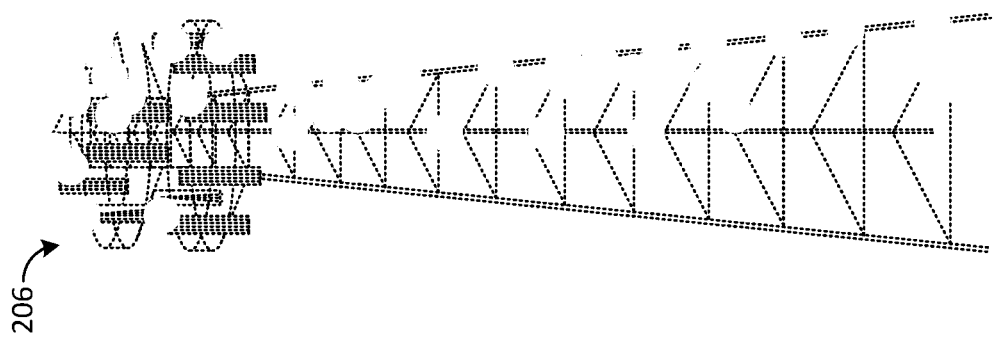
FIGS. 2A-C illustrate portions of three 3D point clouds derived from laser scan data obtained at three different locations near the complex object of FIG. 1.
Figure 2B:
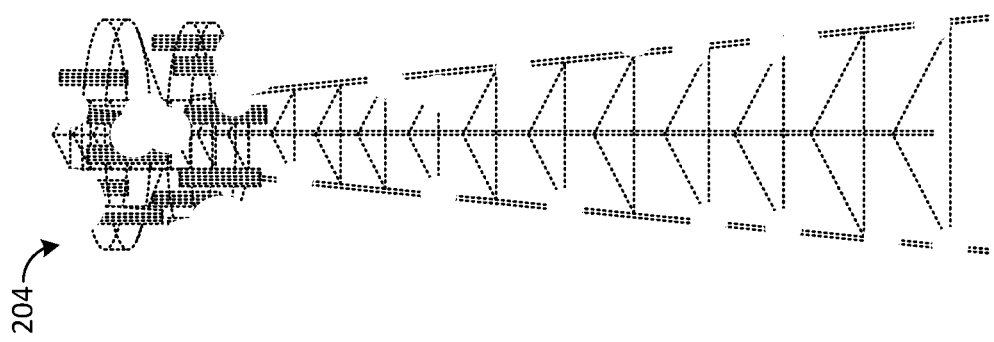
Figure 2A:
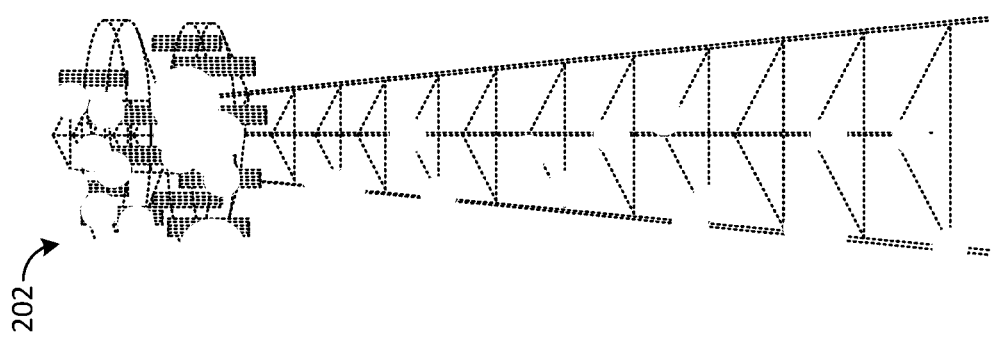

FIGS. 2A-C illustrate portions of three 3D point clouds derived from laser scan data obtained from LiDAR scanner 120 of FIG. 1. Specifically, 3D point clouds 202, 204, and 206 are derived from laser scan data obtained from LiDAR scanner 120 at locations 142, 144, and 146 respectively. As shown in FIGS. 2A-C, 3D point clouds 202, 204, and 206 only contain points corresponding to cell tower 110. However, the laser scan data may be used to derive points corresponding to other objects. Furthermore, as shown in FIGS. 2A-C, each of 3D point clouds 202, 204, and 206 contains a plurality of unique points. This variation may be the result of nearby objects occluding portions of cell tower 110. For example, if LiDAR scanner 120 is placed underneath a tree, the branches of that tree may prevent LiDAR scanner 120 from obtaining laser scan data corresponding to upper portion 162 of cell tower 110. Similarly, the various support members within cell tower 110 may occlude portions of other support members within cell tower 110.

While 3D point clouds 202, 204, and 206 collectively provide an accurate approximation of the dimensions of lower portion 164 of cell tower 110, the same cannot be said for upper portion 162. Setting aside potential interference from nearby objects, lower antenna cluster 114 makes it difficult for LiDAR scanner 120 to collect laser scan data corresponding to upper antenna cluster 112 because lower antenna cluster 114 occludes portions of upper antenna cluster 112 from a ground-based perspective. Similar problems may arise when a cell tower has only one antenna cluster. For example, antennas, support beams and other objects within the singular antenna cluster may occlude portions of other objects within the singular antenna cluster.

FIG. 2D illustrates a portion of a 3D point cloud derived from the plurality of overlapping images captured by UAV 150 of FIG. 1. As explained above, the plurality of overlapping images are captured while UAV 150 flies around upper portion 162 of cell tower 110. Photogrammetry software, such as, for example, Pix4Dmapper Pro, can be used to derive a 3D point cloud from the plurality of overlapping images captured by UAV 150. As can be seen in FIG. 2D, 3D point cloud 208 can provide an accurate approximation of the dimensions of upper portion 162 of cell tower 110.

Although the previous example of generating the 3D point clouds of the cell tower include an occluded upper portion, the generation of the 3D point clouds may be generated for any portion of a complex object. For instance, in the event lower portions of a putting green, such as valleys in the putting green, are occluded from view of the LiDAR, the UAV, or other vehicle having one or more cameras attached, may capture images of these lower occluded portions. 3D point clouds may be generated to provide an accurate approximation of the dimensions of the occluded portions of the putting green based on images captured by the UAV or other such vehicle.

Figure 3:
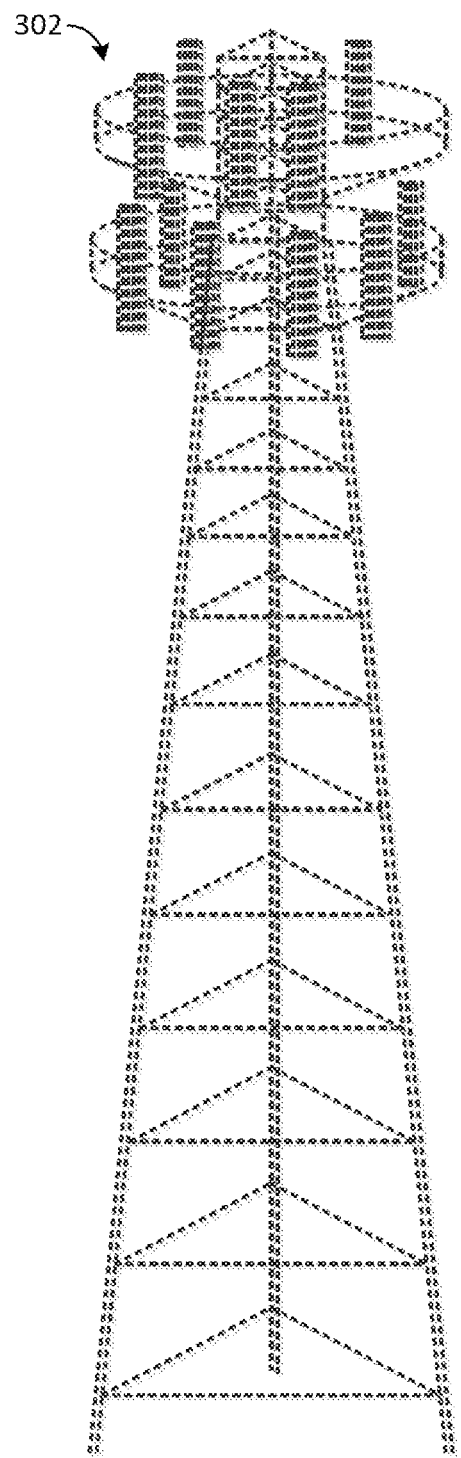
FIG. 3 illustrates a single 3D point cloud that may be derived from the 3D point clouds illustrated in FIGS. 2A-D.

FIG. 3 illustrates a single 3D point cloud that may be derived from the 3D point clouds illustrated in FIGS. 2A-D. 3D point cloud 302 may be used to generate a 3D model of cell tower 110. In some embodiments, software, such as, for example, Leica's Cyclone 3D point cloud processing software, may be used to combine 3D point clouds 202, 204, 206, and 208. As mentioned above, targets 132, 134, and 136 may be used to provide a set of easily identified reference points for combining 3D point clouds 202, 204, and 206. In some embodiments, targets 132, 134, and 136 may also be used to combine 3D point cloud 208 with 3D point clouds 202, 204, and 206. In such embodiments, UAV 150 may be directed to circle around all of cell tower 110, as opposed to just upper portion 162, so as to ensure that UAV 150 captures images of targets 132, 134, and/or 136. In some embodiments, a human operator and/or a computing device may identify a plurality of common reference points in 3D point clouds 202, 204, 206, and 208 by isolating a uniquely shaped feature of cell tower 110 that is at least partially represented in two or more of these 3D point clouds. For example, a human operator and/or a computing device may identify a plurality of common reference points in 3D point clouds 202, 204, 206, and 208 by locating a specific antenna within lower antenna cluster 114 in two or more of these 3D point clouds. In some embodiments, the GPS coordinates of LiDAR scanner 120 and UAV 150 may be used by a human operator and/or a computing device to combine 3D point clouds 202, 204, 206, and 208.

As would be appreciated by one skilled in the art, the 3D point clouds depicted in FIGS. 2A-D and 3 are simplified versions of what would actually be obtained through the use of the disclosed systems and methods. Often these types of 3D point clouds include billions of points. Thus, portions of these 3D point clouds may be nearly indistinguishable from the corresponding portions of a 3D model generated from these 3D point clouds.

Other types of devices can be used to collect the underlying data used to derive the point clouds depicted in FIGS. 2A-D and FIG. 3. However, the use of the two different types of devices disclosed herein together (e.g., UAVs and LiDAR scanners) to map the entire structure with high accuracy provides unique benefits and advantages. For example, while images captured by UAV 150 could theoretically be used to generate a single 3D point cloud with points corresponding to the entirety of cell tower 110, nearby objects, such as trees, buildings or fences, may prevent UAV 150 from capturing images of lower portion 164 of cell tower 110. In such circumstances, LiDAR scanner 120 may be able to more accurately capture data that UAV 150 cannot, and vice-versa. Furthermore, while UAV 150 could also be equipped with a LiDAR scanner, it may be difficult to collect high accuracy laser scan data when the LiDAR scanner is moving and potential solutions to this problem may be costly to implement. Thus, the specific combination of both aerial-based image acquisition and ground-based LiDAR scanning provides unique advantages and results, including reduced costs, increased versatility, and enhanced accuracy not achievable through the use of these technologies in isolation.

In some instances, 3D point clouds may be generated completely by LiDAR or camera images. For instance, one or more cameras may capture a collection of images of a complex object, such as a putting green. In the event the entire putting green is contained within the collection of images, a 3D model of the putting green may be modeled as described herein without the need for LiDAR scan data. In some instances no targets may be used, as the images may be positioned relative to each other and not a known target location.

Figure 4:
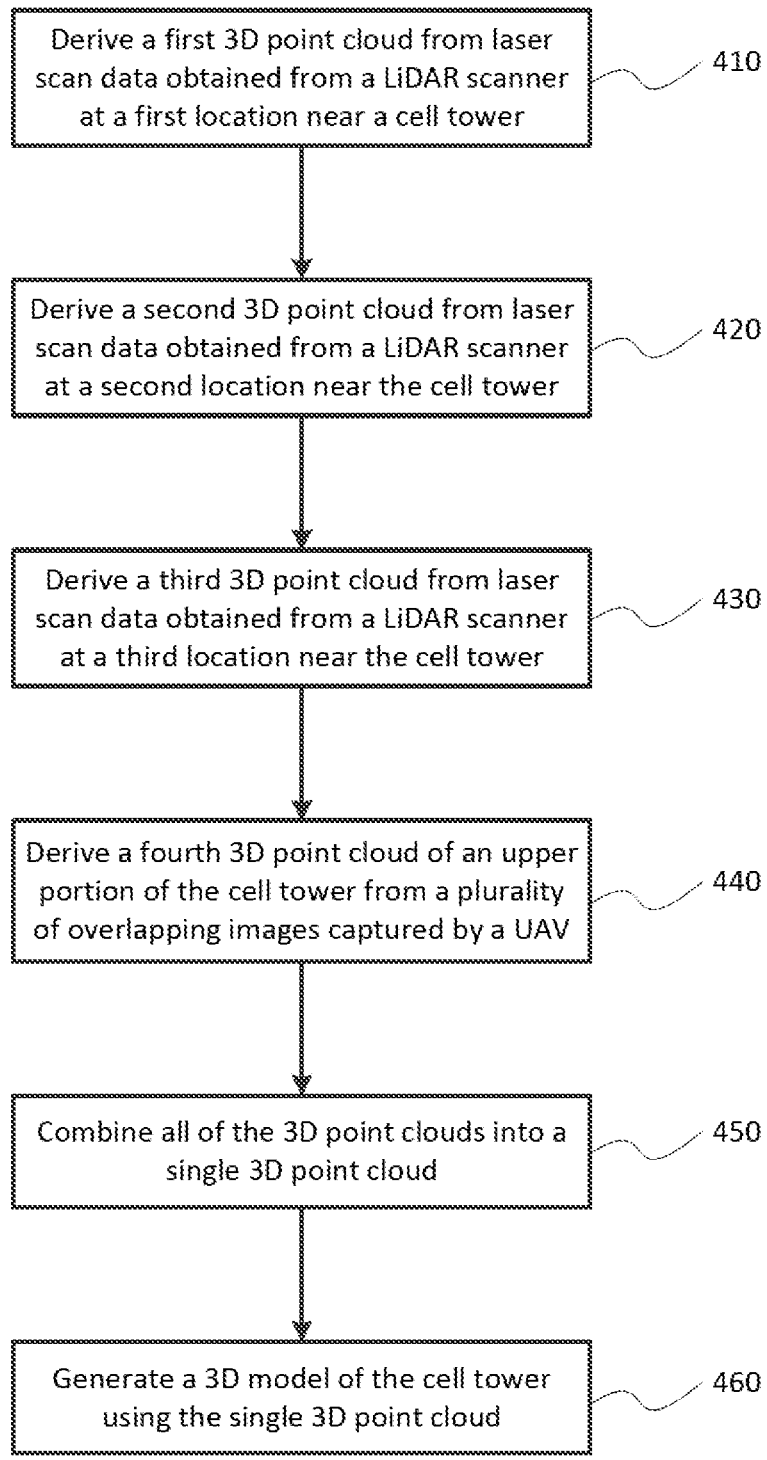
FIG. 4 illustrates a method for generating a 3D model of a complex object according to aspects of the disclosure.

FIG. 4 illustrates a method for generating a 3D model of a cell tower according to aspects of the disclosure. While operations of the method are described in a particular order below, it should be understood that the order of the operations may be modified. For example, method 400 specifically refers to generating a 3D model of a cell tower. However, the method could be modified to generate a 3D model of any complex structure. Moreover, some operations may be performed simultaneously. Operations may also be added or omitted.

In block 410, a first 3D point cloud is derived from laser scan data obtained from a LiDAR scanner at a first location near a cell tower. The first 3D point cloud may include a plurality of points corresponding to where, relative to the first location of the LiDAR scanner, laser beams were reflected off of the surfaces of nearby objects. The location of the LiDAR scanner may have been selected after analyzing the site of the cell tower. Preferably, the LiDAR scanner was placed in an open area where few objects occluded the LiDAR scanner's view of the cell tower. As explained above with reference to FIG. 1, three or more targets mounted on tripods may have been placed at equally spaced locations around the cell tower before any laser scan data was collected. Furthermore, the targets may have been oriented such that they faced the LiDAR scanner. In some embodiments, multiple scans at varying resolutions may have been performed at the first location. For example, the LiDAR scanner could have been used to perform a 360° scan of the entire site of the cell tower at a resolution of $\frac{1}{16}$ in. The LiDAR scanner could also have been used to only scan a portion of the cell tower at a higher resolution. For example, the LiDAR scanner could have been used to only scan the upper portion of the cell tower at a resolution of $\frac{1}{32}$ in. Similarly, the LiDAR scanner could have been used to only scan the lower portion of the cell tower at a resolution of $\frac{1}{32}$ in. In some embodiments, a 360° scan could have been used to verify that high-resolution laser scan data corresponding to specific portions of the cell tower were properly combined.

In blocks 420 and 430, a second and a third 3D point cloud are derived from laser scan data obtained from a LiDAR scanner at a second and a third location, respectively, near the cell tower. In many ways, the procedure implemented at these blocks is identical to the procedure implemented at block 410. However, the underlying laser scan data was obtained from a LiDAR scanner at different locations. Furthermore, the laser scan data may consist of more or less scans. For example, the laser scan data at the second and third locations may only consist of a first scan of the lower portion of the cell tower at a resolution of $\frac{1}{32}$ in. and a second scan of the upper portion of the cell tower at a resolution of $\frac{1}{32}$ in. In other embodiments, additional similar blocks may be included in method 400. For example, additional 3D point clouds could be derived from laser scan data obtained with a LiDAR scanner at other locations. Similarly, in other embodiments, either or both of blocks 420 and 430 may be eliminated from method 400.

In block 440, a fourth 3D point cloud of an upper portion of the cell tower is derived from a plurality of overlapping images captured by a UAV. As explained above with reference to FIG. 1, the UAV may have been directed to circle around the center of the cell tower at a radius of 27 to 33 ft. and a speed at 0.8 to 1.2 mph. Furthermore, the UAV may have captured an image of the upper portion of the cell tower at every 3 to 5 degrees of this circular flight pattern. After completely circling the cell tower, the UAV 150 may have been directed to decrease its elevation by, for example, 2.8 to 3.2 ft., and then directed to repeat a similar circular flight pattern. In some embodiments, the UAV may have started capturing images at an elevation where the top of the cell tower was within the field of view of a camera attached to the UAV and stopped capturing images when the lowest antenna cluster was completely outside of the field of view of the camera attached to the UAV. In some embodiments, the UAV may have captured images of the entire cell tower and a plurality of targets. In some embodiments, the overlap between any pair of images consecutively captured at the same elevation may be 95% or more.

In some embodiments, the images captured by the UAV may not be geotagged or associated with a particular location. Therefore, in some embodiments, a log file detailing the flight pattern of the UAV may be created. For example, a website, such as HealthyDrones.com, can be used to generate Comma Separated Value ("CSV") file detailing the flight pattern of a UAV. Another website, such as GPS Visualizer, can be used to convert this CSV file into a GPS Exchange Format ("GPX") file.

Based on the timestamps embedded in the log file and the timestamps embedded in the metadata of the capture images, the captured images can be geotagged. Since the timestamps may not match up exactly, it may be necessary to interpolate the location of the UAV. Software, such as GeoSetter, can be used to make these modifications to the metadata of the captured images. When using Geosetter, it may be advantageous to use the following settings: "sync with visible tracks," "interpolate," "sync heading data," "do not use track points in future," and "use time zone for adjust method."

Once the images have been geotagged, photogrammetry software, such as, for example, Pix4Dmapper Pro, can be used to derive the fourth 3D point cloud. The photogrammetry software may also be used to eliminate points associated with objects other than the cell tower. When using Pix4Dmapper Pro, it may be advantageous to initially process the geotagged images using the following settings: "Keypoint Image Scale at Full," "Matching Image Pairs at Free Flight or Terrestrial," "Matching Strategy at Use Geometrically Verified Matching," "Targeted Number of Keypoints at Automatic," "Calibration Method at Standard," "Camera Optimization of Internal and External Parameters both at All," and "Rematch at Custom and Rematch." When using Pix4Dmapper to derive the fourth 3D point cloud, it may be advantageous to use the following settings: "Image Scale at Original with no Multiscale," "Point Density at Optimal," "Minimum Number of Matches at 5," "Export at XYZ with Delimiter at Comma," "Matching Window Size at 9×9 pixels," "Point Cloud Filters at Use Processing Area," and "Use Annotations and Limit Camera Depth Automatically."

In block 450, the first, second, third, and fourth 3D point clouds are combined into a single 3D point cloud. Leica's Cyclone 3D point cloud processing software may, for example, be used to facilitate this process. If targets were used when the laser scan data underlying the first, second, and third 3D point clouds was collected, these 3D point clouds can be combined based on the locations of these targets. In some embodiments, a human operator and/or a computing device may identify a plurality of common reference points in the first, second, third, and fourth 3D point clouds. This may be accomplished, in part, by identifying a uniquely shaped feature of the cell tower that is at least partially represented in two or more of these 3D point clouds. For example, a human operator and/or a computing device may identify a plurality of common reference points in the first, second, third, and fourth 3D point clouds by locating a specific antenna within an antenna cluster in two or more of these 3D point clouds. In some embodiments, the GPS coordinates of the LiDAR scanner and the UAV may be used by a human operator and/or a computing device to combine the first, second, third, and fourth 3D point clouds.

In block 460, a 3D model of the cell tower is generated using the single 3D point cloud. Software, such as Leica Cyclone, Leica CloudWorx, and/or AutoCAD, may be used to extract structural members and other objects from the single 3D point cloud to generate the 3D model of the cell tower. Through the use of the disclosed systems and methods, the dimensions of the various structural support members within the 3D model of the cell tower may be accurate to within, for example, 1 mm. In some embodiments, the accuracy may be within 0.5 mm With this degree of accuracy, the 3D model of the cell tower can be used directly to perform a structural analysis of the cell tower. This structural analysis may be facilitated by software, such as RISA-3D, RISAFoundation and RISAConnection. Notably, nowhere in the process described above was a worker required to climb the cell tower. Furthermore, no endangered wildlife was interfered with by a worker climbing the cell tower.

Method 400 may be implemented on one or more computing devices. The one or more computing devices may, for example, contain one or more processors, memories, and other components typically present in general purpose computing devices. The one or more processors may be any conventional processors, such as, for example, commercially available CPUs. The processors may also be dedicated devices such as, for example, ASICs or other hardware-based processors. The one or more memories may be of any type capable of storing information accessible by the one or more processors. For example, one or more memories may include a computing device-readable medium, or other medium that stores data that may be read with the aid of an electronic device, such as, for example, a hard-drive, memory card, ROM, RAM, DVD or other optical disks, as well as other write-capable and read-only memories. The information stored in the one or more memories may include instructions and data that may be executed or otherwise used by the one or more processors. The instructions may be stored in object code format for direct processing by the processor, or in any other computing device language including scripts or collections of independent source code modules that are interpreted on demand or compiled in advance.

The foregoing description has focused primarily on systems and methods for generating a 3D model of a cell tower through the use of a LiDAR scanner and a UAV. However, one skilled in art would appreciate that the disclosed systems and methods can be readily adapted to generate 3D models of other complex objects. For example, the systems and methods disclosed above are especially advantageous when an upper portion of any tall structure is occluded by other portions of that structure. Furthermore, other types of scanning devices can replace the LiDAR scanner. For example, scan data obtained from an infrared scanner, a radar scanner, and/or an ultrasonic scanner can be used to derive a 3D point cloud in accordance with the present disclosure.

Other devices or mechanisms can be used to obtain images of the upper portions of a tall, complex object. For example, a terrestrial device with a large appendage, such as a crane, could be used to capture images of an upper portion of a tall complex object, while a smaller complex object may be captured with the assistance of a remote vehicle. Moreover, the devices and vehicles may include any autonomous, piloted, or remotely operated device or vehicles, such as helicopters, airplanes, cars, trucks, etc.

As these and other variations and combinations of the features discussed above can be utilized, the foregoing description of the embodiments should be taken by way of illustration rather than by way of limitation of the disclosure. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method comprising:
   capturing a plurality of overlapping images of a complex object from one or more cameras mounted to an unmanned aerial vehicle (UAV), wherein each image of the plurality of overlapping images overlaps one or more respective other images in the plurality of overlapping images by more than 90%;
   deriving a first 3D point cloud of a first portion of the complex object from the plurality of overlapping images, wherein at least a section of the first portion of the complex object is partially or wholly occluded;
   deriving a second 3D point cloud from laser scan data obtained from one or more LiDAR scanners at a first location near the complex object;
   deriving a third 3D point cloud from laser scan data obtained from the one or more LiDAR scanners at a second location near the complex object;
   combining the first, second, and third 3D point clouds into a single 3D point cloud; and
   generating a 3D model of the complex object from the single 3D point cloud.

2. The method of claim 1, wherein the first portion is the entire complex object.

3. The method of claim 1, further comprising:
   deriving a fourth 3D point cloud from laser scan data obtained from the one or more LiDAR scanners at a third location near the complex object,
   wherein combining the first, second, and third 3D point clouds into the single 3D point cloud includes combining the first, second, third, and fourth 3D point clouds into the single 3D point cloud.

4. The method of claim 3, wherein the second 3D point cloud, the third 3D point cloud, and the fourth 3D point cloud are respectively captured from one or more ground-based perspectives.

5. The method of claim 4, wherein the complex object is a cell tower.

6. The method of claim 5, wherein the first portion of the complex object is an upper portion of the cell tower and the section includes at least one antenna cluster.

7. The method of claim 1, wherein the complex object is one or more of a putting green, a fairway, and tee box.

8. The method of claim 3, wherein first portion of the complex object is a lower portion of the complex object.

9. The method of claim 3, wherein the second 3D point cloud, the third 3D point cloud, and the fourth 3D point cloud are respectively captured from one or more ground-based perspectives.

10. The method of claim 9, wherein the first portion is partially or wholly occluded from at least one of the one or more ground-based perspectives.

11. The method of claim 1, wherein the plurality of images are captured from the perspective of an UAV in flight.

12. A system comprising:
    one or more computing devices having one or more processors; and
    memory storing instructions executable by the one or more processors, wherein the instructions comprise:
    receiving a plurality of overlapping images of a complex object from one or more cameras mounted to an unmanned aerial vehicle (UAV), wherein each image of the plurality of overlapping images overlaps one or more respective other images in the plurality of overlapping images by more than 90%;
    derive a first 3D point cloud of a first portion of a complex object from the plurality of overlapping images, wherein at least a section of the first portion of the complex object is partially or wholly occluded;
    deriving a second 3D point cloud from laser scan data obtained from one or more LiDAR scanners at a first location near the complex object;
    deriving a third 3D point cloud from laser scan data obtained from the one or more LiDAR scanners at a second location near the complex object;
    combining the first, second, and third 3D point clouds into a single 3D point cloud; and
    generating a 3D model of the complex object from the single 3D point cloud.

13. The system of claim 12, wherein the instructions further comprise:
    deriving a fourth 3D point cloud from laser scan data obtained from the one or more LiDAR scanners at a third location near the complex object;
    wherein combining the first, second, and third 3D point clouds into the single 3D point cloud includes combining the first, second, third, and fourth 3D point clouds into the single 3D point cloud.

14. The system of claim 13, wherein the complex object is a cell tower.

15. The system of claim 14, wherein the first portion of the complex object is an upper portion of the cell tower and the section includes at least one antenna cluster.

16. The system of claim 12, wherein the complex object is one or more of a putting green, a fairway, and tee box.

17. The method of claim 1, wherein the plurality of overlapping images include images captured at two or more elevations.

18. The system of claim 12, wherein the plurality of overlapping images include images captured at two or more elevations.

19. The system of claim 12, wherein the first portion is the entire complex object.

* * * * *